Patented Jan. 12, 1932

1,841,335

UNITED STATES PATENT OFFICE

GEORGE W. MILES, OF BOSTON, MASSACHUSETTS, ASSIGNOR TO CELANESE CORPORATION OF AMERICA, A CORPORATION OF DELAWARE

PROCESS OF PREPARING CELLULOSE ETHERS

No Drawing. Application filed July 10, 1928. Serial No. 291,705.

This invention relates to the preparation of cellulose ethers such as ethyl cellulose, methyl cellulose or benzyl cellulose in a novel manner.

An object of my invention is to prepare cellulose ethers directly from cellulose, and thus prepare cellulose ethers in a simpler and more expeditious manner than has heretofore been possible.

In the methods of preparing cellulose ethers that have been previously proposed, cellulose was first treated with a caustic soda solution of comparatively low concentration, say from 15 to 20%. Because of the large amount of water present in such solutions, it had been necessary to press the excess caustic soda solution from the alkali cellulose that was thus formed prior to etherification, since the presence of this large amount of water produced inferior products. This pressing operation is expensive and cumbersome. I have found that cellulose ethers may be prepared directly from cellulosic materials by adding the etherifying agent and then treating with caustic soda.

In accordance with my invention, I prepare cellulose ethers by treating cellulosic material with a suitable etherifying agent for a period of time at temperatures about that of the room. To prevent tendering of the cellulosic material by the action of the etherifying agent, I prefer to add a small amount of an alkaline material such as sodium carbonate, potassium carbonate, caustic soda and the like. The amount of etherifying agent that is employed may vary from 3 to 10 molecular proportions to one molecular proportion of the cellulose employed. This amount of etherifying agent may be added at once at this stage, or if desired, part of it may be added at this stage and the other part either at once or in increments after the bulk of the alkali has been added. Sufficient alkali in a concentrated state is then added to the mixture of the cellulose and etherifying agent to cause complete reaction. The reaction mixture may be gently heated but it is preferred not to permit the temperature to rise above 30°, 40°, 50° or 60° C. until the reaction is completed, which usually requires from 5 to 24 hours.

The cellulosic material employed in my process may be any suitable one that is used for making cellulose derivatives. Examples of such cellulosic materials are cotton linters, cotton, wood pulp, reconstituted cellulose prepared from viscose, etc. The etherifying agent employed may be any suitable alkyl, aryl or aralkyl ester corresponding to the cellulose ether it is desired to form. I have found that diethyl sulfate, ethyl chloride, ethyl bromide or ethyl iodide gives satisfactory results when ethyl cellulose is to be prepared. For preparing methyl cellulose, I may employ dimethyl sulfate, methyl chloride, methyl bromide or methyl iodide. If benzyl cellulose is to be made, benzyl chloride, benzyl bromide or benzyl iodide may be employed.

The cellulosic material is permitted to contact with the etherifying agent for several hours at temperatures ranging from 0° C. to 45° C. The alkali to be employed for causing the etherification of the cellulose may be sodium hydroxide, potassium hydroxide or mixtures of the two. The alkali may be added all at once or it may be added in increments. As stated, the alkali is added in a concentrated state which may be either in the finely divided solid state or in concentrated aqueous or alcoholic solution, say from 40 to 50% when caustic soda is used. If desired, both concentrated solutions of the alkali and the solid alkali may be employed. The amount of alkali added is sufficient to react with all of the etherifying agent that is present.

In order further to illustrate my invention the following detailed examples are given but it is to be understood that my invention is not limited thereto.

Example I 5 kilograms of cotton linters are treated with 60 litres of diethyl sulfate and 2 kilograms of sodium carbonate. The mixture is permitted to stand over night at a temperature of about 45° C. after which it is cooled and 25 litres of 50% aqueous caustic soda solution are added. The mixture is placed in a vessel having a water jacket and the temperature is maintained at 40° C. for about 12 hours and an ether is produced that is almost completely soluble in benzene and alcohol.

Example II 10 kilograms of cotton linters are treated with 2 kilograms of caustic soda and 100 kilograms of diethyl sulfate and permitted to stand over night at 40° C. The mixture is then cooled and 50 kilograms of aqueous 50% caustic soda solution are added and the mass is then permitted to remain for 20 hours at 40° C., after which it is heated to 60° C. for 2 hours. The reaction mass is then washed. An ether almost completely soluble in benzene and alcohol is thus formed.

Example III 10 kilograms of cotton linters are treated with 70 litres of diethyl sulfate and 2 kilograms of sodium carbonate over night. 20 litres of 50% aqueous caustic soda solution are then added together with 5 kilograms of finely divided solid caustic soda (20 mesh). The mixture is maintained at about 45° C. for about 5 hours and is then washed. There is produced 10 kilograms of ethyl cellulose of which 25% is soluble in benzene and the remainder (except for a trace) soluble in ethyl alcohol.

It is to be understood that the foregoing detailed description is given merely by way of illustration and that many variations may be made therein without departing from the spirit of my invention.

Having described my invention, what I claim and desire to secure by Letters Patent is:

1. Method of preparing cellulose ethers comprising treating cellulosic material with an etherifying agent, subsequently adding an alkali to the mixture of cellulosic material and etherifying agent and then permitting the material to react until a cellulose ether is formed.

2. Method of preparing cellulose ethers comprising treating cellulosic material with an etherifying agent, subsequently adding to the mixture sufficient alkali in a concentrated state to react with the etherifying agent present and maintaining the materials at the desired reaction temperature until the reaction is completed.

3. Method of preparing ethyl cellulose comprising treating cellulosic material with an ethylating agent for several hours, adding to the mixture sufficient alkali in a concentrated state to react with the ethylating agent present and maintaining the materials at the desired reaction temperature until the reaction is completed.

4. Method of preparing methyl cellulose comprising treating cellulosic material with a methylating agent for several hours, adding to the mixture sufficient alkali in a concentrated state to react with the methylating agent present and maintaining the materials at the desired reaction temperature until the reaction is completed.

5. Method of preparing benzyl cellulose comprising treating cellulosic material with a benzylating agent for several hours, adding to the mixture sufficient alkali in a concentrated state to react with the benzylating agent present and maintaining the materials at the desired reaction temperature until the reaction is completed.

6. Method of preparing ethyl cellulose comprising treating cotton linters with an ethylating agent, subsequently adding to the mixture sufficient alkali in a concentrated state to react with the ethylating agent present and maintaining the materials at the desired reaction temperature until the reaction is completed.

7. Method of preparing ethyl cellulose comprising treating the cellulosic material with diethyl sulfate, subsequently adding to the mixture sufficient alkali in a concentrated state to react with the diethyl sulfate present and maintaining the materials at the desired reaction temperature until the reaction is completed.

8. Method of preparing ethyl cellulose comprising treating the cellulosic material with diethyl sulfate in the presence of a small amount of alkali, subsequently adding to the mixture sufficient alkali in a concentrated state to react with the diethyl sulfate present and maintaining the materials at the desired reaction temperature until the reaction is completed.

9. Method of preparing ethyl cellulose comprising treating the cellulosic material with 3 to 10 molecular proportions of diethyl sulfate to one molecular proportion of cellulose, subsequently adding to the mixture sufficient alkali in a concentrated state to react with the diethyl sulfate present, and maintaining the materials at the desired reaction temperature until the reaction is completed.

10. Method of preparing ethyl cellulose comprising treating the cellulosic material with 3 to 10 molecular proportions of diethyl sulfate to one molecular proportion of cellulose in the presence of a small amount of alkali, subsequently adding to the mixture sufficient alkali in a concentrated state to react with the diethyl sulfate present, and maintaining the materials at the desired reaction temperature until the reaction is completed.

11. Method of preparing methyl cellulose comprising treating the cellulosic material with 3 to 10 molecular proportions of dimethyl sulfate to 1 molecular proportion of cellulose in the presence of a small amount of alkali, subsequently adding to the mixture sufficient alkali in a concentrated state to react with the dimethyl sulfate present and maintaining the materials at the desired reaction temperature until the reaction is completed.

12. Method of preparing benzyl cellulose comprising treating the cellulosic material with 3 to 10 molecular proportions of benzyl chloride to 1 molecular proportion of cellulose in the presence of a small amount of alkali, subsequently adding to the mixture sufficient alkali in a concentrated form to react with the benzyl chloride present and maintaining the materials at the desired reaction temperature until the reaction is completed.

13. Method of preparing ethyl cellulose comprising treating cotton linters with diethyl sulfate for several hours, adding to the mixture sufficient alkali in a concentration exceeding 40% to react with the diethyl sulfate and maintaining the temperature of reaction between 30° and 60° C. until the reaction is completed.

14. Method of preparing benzyl cellulose comprising treating cotton linters with benzyl chloride for several hours, adding to the mixture sufficient alkali in a concentration exceeding 40% to react with the benzyl chloride and maintaining the temperature of reaction between 30° and 60° C. until the reaction is completed.

15. Cellulose ethers prepared by treating a cellulosic material with an etherifying agent, subsequently adding an alkali to the mixture of cellulosic material and etherifying agent and then permitting the material to react until a cellulose ether is formed.

16. Ethyl cellulose prepared by treating a cellulosic material with an ethylating agent for several hours, adding an alkali to the mixture of cellulosic material and ethylating agent and then permitting the material to react until ethyl cellulose is formed.

In testimony whereof, I have hereunto subscribed my name.

GEORGE W. MILES.